United States Patent [19]

Moreau et al.

[11] Patent Number: 5,180,921

[45] Date of Patent: Jan. 19, 1993

[54] METHOD AND APPARATUS FOR MONITORING THE TEMPERATURE AND VELOCITY OF PLASMA SPRAYED PARTICLES

[75] Inventors: Christian Moreau; Mario Lamontagne, both of Boucherville; Paolo Cielo, Montreal, all of Canada

[73] Assignee: National Research Council of Canada, Ottawa, Canada

[21] Appl. No.: 793,518

[22] Filed: Nov. 18, 1991

[51] Int. Cl.$^5$ .............................................. G01J 1/20
[52] U.S. Cl. ............................... 250/554; 250/227.11; 250/425; 219/121.47; 356/28
[58] Field of Search ........... 250/423, 425, 561, 227.11, 250/237 R, 554, 226; 219/121.47, 121.59, 121.42; 356/28, 28.5

[56] References Cited

U.S. PATENT DOCUMENTS 4,322,165 3/1982 Ellebracht et al. ................. 356/316
5,054,913 10/1991 Ishikawa et al. ............... 250/237 R Primary Examiner—David C. Nelms
Attorney, Agent, or Firm—Pascal & Associates

[57] ABSTRACT

A method and an apparatus for monitoring simultaneously the temperature and the velocity of sprayed particles. The system is comprised of a sensor head attached to the spray gun, an optical fibre transmitting the collected radiation to detection apparatus, and a protective detection cabinet having the detection apparatus that incorporates two detectors. A two-slit or multiple-slit mask is located in the sensor head at the end of the optical fibre. For the temperature measurements, the particle emitted radiation collected by the sensor head is transmitted to two photodetectors, filtered by interference filters at two adjacent wavelengths. The particle temperature may be computed from the ratio of the detector outputs. To measure the velocity, the two-slit system collects radiation emitted by the in-flight particles travelling in the sensor field of view, which generates a double peak light pulse transmitted through the optical fibre. The time delay between these two peaks may be evaluated automatically and the particle velocity computed knowing the distance between the two slit images.

14 Claims, 3 Drawing Sheets

METHOD AND APPARATUS FOR MONITORING THE TEMPERATURE AND VELOCITY OF PLASMA SPRAYED PARTICLES

FIELD OF THE INVENTION

This invention relates to optical sensors for use in thermal spray processes and in particular, in plasma spray processes.

BACKGROUND TO THE INVENTION

Plasma spraying is a powerful technique used widely to produce protective coatings on a large variety of substrates. For example, thermal barrier coatings are plasma sprayed in producing aircraft engines, and ceramic and metal coatings are plasma sprayed for various purposes. Coating properties depend upon many spraying parameters, some of them being related to the spray gun operation. Consequently spraying process control has been implemented by monitoring and regulating such gun input variables as arc current and power, arc gas flow rates, powder feed rate, and powder carrier gas pressure, to keep them at predetermined optimum values. This control approach has been found to be complex because a large number of interrelated input variables must be monitored, and has been found to be incomplete because some variables, such as electrode wear state, cannot be monitored at all.

SUMMARY OF THE PRESENT INVENTION

The present invention has been found to be a more powerful structure and method for controlling the plasma spray process. In the present invention, the direct process parameters are monitored rather than (or in addition to) the indirect gun input variables. It has been found that the most important parameters that control directly the coating microstructure and properties are the temperature and the velocity of the particles immediately before their impact on the substrate. In the present invention, the temperature and velocity are measured on-line, and provide an efficient feedback signal generator performing feedback for the gun input parameters to maintain optimum spraying conditions, and can be used as an efficient diagnostic tool to detect rapidly any problem during the coating operation. Since the temperature and velocity have a direct influence on the coating quality, the present invention facilitates obtaining a closer control of the spraying process, leading to a better reproducibility of the coating properties than in the prior art.

Different techniques exist to perform temperature measurements of in-flight particles. J. Mishin et al, as reported in the J. Phys. E: Sci. Instrum., 20 (1987) 620–5, used a pair of monochromators and fast photomultipliers to determine the surface temperature of individual particles. In another approach, as described in U.S. Pat. No. 4,656,331 to Lillquist et al, a mid-infrared ($>3$ $\mu$m) sensor is used to monitor the light intensity emitted by the particle jet, the collected signal being related to the particle temperature. In this case, however, information about the particle temperature distribution is not available since signals emitted by individual particles are not time resolved. Thus, radiation from the luminous plasma may be detected biasing the particle temperature measurements. Also, the apparent average temperature is biased toward the highest temperature particles because of the nonlinearity of the radiance-vs-temperature emission curves.

There have been two types of techniques previously available to perform an in-flight particle velocity measurement. In the first type of techniques, the velocity information is obtained from light impinging upon and reflected by the particles, detected by an appropriate sensor. Laser based techniques, such as laser Doppler anemometry and laser dual focus velocimetry, are included in this first type of techniques. They use intense laser light beams to form interference fringes, or use two focused light beams in the measurement region. When the particle trajectory intercepts the measurement region, the reflected light intensity is modulated as the particle travels through the intensely illuminated zones and the velocity is computed from the modulation period. Periodic light distributions may also be obtained using a high intensity incandescent source and a Ronchi grating. This technique is inappropriate, being bulky and requiring high intensity light sources.

The second type of techniques used to perform the velocity measurement takes advantage of the thermal radiation emitted by the particles heated to a high temperature by the plasma. The radiation emitted by individual particles is detected when the particles pass through the detector field of view of known dimensions. The transit time is evaluated and the velocity is computed knowing the travel length. Since the dimensions of the field of view change with the distance from the optical detection assembly, it is necessary to analyze only particles near the assembly focal plane. To do that, a laser beam or a second detection assembly focused in the appropriate region from a different angle must be used in conjunction with a coincidence detection analysis system. Such a system is complex and difficult to keep well aligned under practical operating conditions. In this same type of techniques, velocity measurements can also be performed using high speed cameras. In this case, light emitted by the particles is used to image them on a high speed film and, from these images, the particle velocity is determined. Such a system can be used for a laboratory investigation, but it is not suitable for real time operation in the harsh plasma-spray environment.

The present invention is a method and an apparatus for monitoring simultaneously the temperature and the velocity of sprayed particles without the limitations and problems described above, for previously developed technology. Temperature measurements are performed using a two-colour pyrometry technique, while the velocity measurements are done using a two-slit or a multiple-slit system that collects radiation emitted by the hot particles. The detection assembly permits the simultaneous determination of the temperature and the velocity of each individually-detected particle.

The system is comprised of a sensor head attached to the spray gun, an optical fibre transmitting the collected radiation to detection apparatus, and a protective detection cabinet having the detection apparatus that incorporates two detectors. A two-slit or multiple-slit mask is located in the sensor head at the end of the optical fibre.

The result is a rugged optical sensor that monitors the temperature and velocity distributions of plasma-sprayed particles simultaneously, immediately before their impact, in which the optical fibres permit the location of the fragile optical and electronic components away from the aggressive environment around the plasma gun. The sensor head is located in the harsh environment close to the plasma, and indeed is preferably attached to the plasma gun for collecting radiation emitted by the hot particles.

For the temperature measurements, the particle emitted radiation collected by the sensor head is transmitted to two photodetectors, filtered by interference filters at two adjacent wavelengths. The particle temperature may be computed from the ratio of the detector outputs. To measure the velocity, the two-slit system collects radiation emitted by the in-flight particles travelling in the sensor field of view, which generates a double peak light pulse transmitted through the optical fibre. The time delay between these two peaks may be evaluated automatically and the particle velocity computed knowing the distance between the two slit images. The velocity measurement can be performed also with a system of three or more slits.

The sensor head can also include a linear fibre bundle that provides a continuous monitoring of the position of the sprayed-particle cone. The light collected by the fibre bundle may be detected by a linear CCD camera. This permits the automatic centering of the sensor head field of view relative to the sprayed-particle cone and the detection of any changes in the particle injection conditions.

The above-computation is preferably performed by a processor, e.g. a personal computer, which can be programmed to continuously perform statistical computations to obtain the mean and standard deviation of the temperature and velocity distributions. These values and the particle cone position are directly related to the deposition process and are provided to the control apparatus as feedback signals whereby the main spraying variables of arc current, powder feeding gas pressure, etc. as noted above may be controlled.

In accordance with an embodiment of the invention, a method of detecting a characteristic of plasma sprayed particles in a plasma jet during flight between a plasma jet gun and a substrate, is comprised of the steps of focusing radiation emitted from a particle on a first photodetector through a slit mask formed of at least two parallel slits, and transmitting signals from the photodetector to a processor for determining the velocity of the particle from the difference in time slit images are detected resulting from said radiation.

In accordance with another embodiment, the invention further includes the step of splitting the radiation, filtering the radiation into separate adjacent wavelengths, passing one wavelength to the first photodetector, passing the other wavelength to a second photodetector, and transmitting signals from the second photodetector to the processor for integrating the signals from both photodetectors and determining the temperature of the particle from the ratio of the integrated signals.

In both of the above embodiments, it is preferred that the focusing step includes carrying the radiation via an optical fibre from a position adjacent the plasma jet to a protected location remote from the plasma jet, and locating the photodetectors in the protected location.

In accordance with another embodiment an optical sensor for plasma sprayed particles in a plasma jet is comprised of a sensor head mounted rigidly adjacent the plasma jet; the head comprising an optical fibre for carrying radiation emitted by a particle in the jet to a protected location remote from the jet, optical apparatus for focusing the radiation on a first end of the fibre, and a slit mask formed of a pair of parallel slits disposed over the end of the fibre through which the radiation may pass; and at the protection location, a pair of photodetectors, apparatus for splitting the radiation from a second end of the fibre, apparatus for filtering the split radiation into two separate adjacent wavelengths, and apparatus for passing the separate wavelengths into respective ones of the photodetectors.

BRIEF INTRODUCTION TO THE DRAWINGS

A better understanding of the invention will be obtained by reference to the detailed description below, in conjunction with the following drawings, in which:

FIG. 1 is a sectional view of a sensor head in accordance with the present invention and of a plasma torch to which the sensor head is rigidly attached, FIG. 1A illustrates an optical mask used in the invention, FIG. 2 is a block diagram of another portion of the invention, which is attached to the sensor head of FIG. 1, FIG. 3 illustrates the field of view of the pair of slits shown in FIG. 1A, and FIG. 4 is a graph of the amplitudes of the output signals of the two detectors shown in FIG. 2 as a function of time.

DESCRIPTION OF THE PREFERRED EMBODIMENT OF THE INVENTION

Figure 1A:
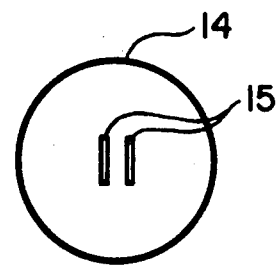
Figure 1:
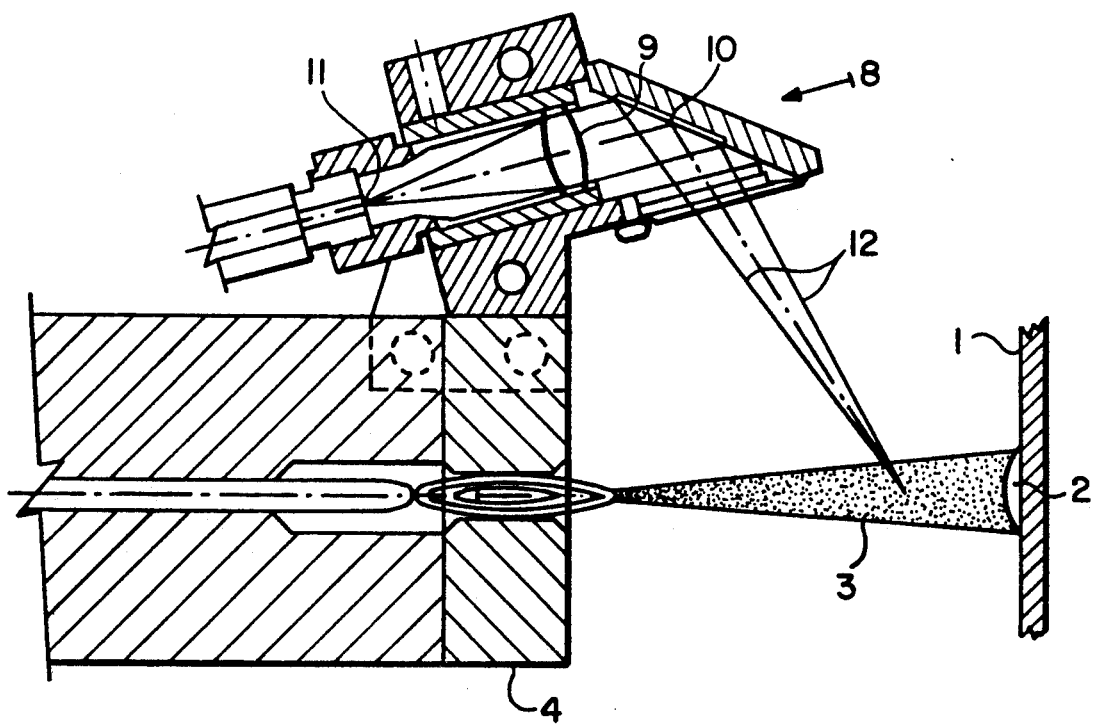

Turning to FIG. 1, a substrate 1 is given a coating 2 by means of a plasma spray 3 of hot particles, emitted by a plasma spray gun 4. A sensor head 8 is comprised of a lens 9 that images, after reflection on a flat mirror 10, the first end of an optical fibre 11 into the particle jet of hot particles 3 preferably to a single particle. Ray lines 12 illustrate the reciprocal imaging of a particle onto the end of the optical fibre 11.

The first end of the fibre is covered by an optical mask 14 as shown in FIG. 1A. The optical mask contains two transparent parallel slits 15. Preferably the slits are about 25 $\mu$m wide, 50 $\mu$m long and 50 $\mu$m center to center. With an optical magnification of 3, the slits formed by the lens 9 are about 75 $\mu$m wide, 150 $\mu$m long, and 150 $\mu$m center to center. The slit size and arrangement are important for reliable temperature and velocity measurements even when high particle flow rates are used.

Figure 2:
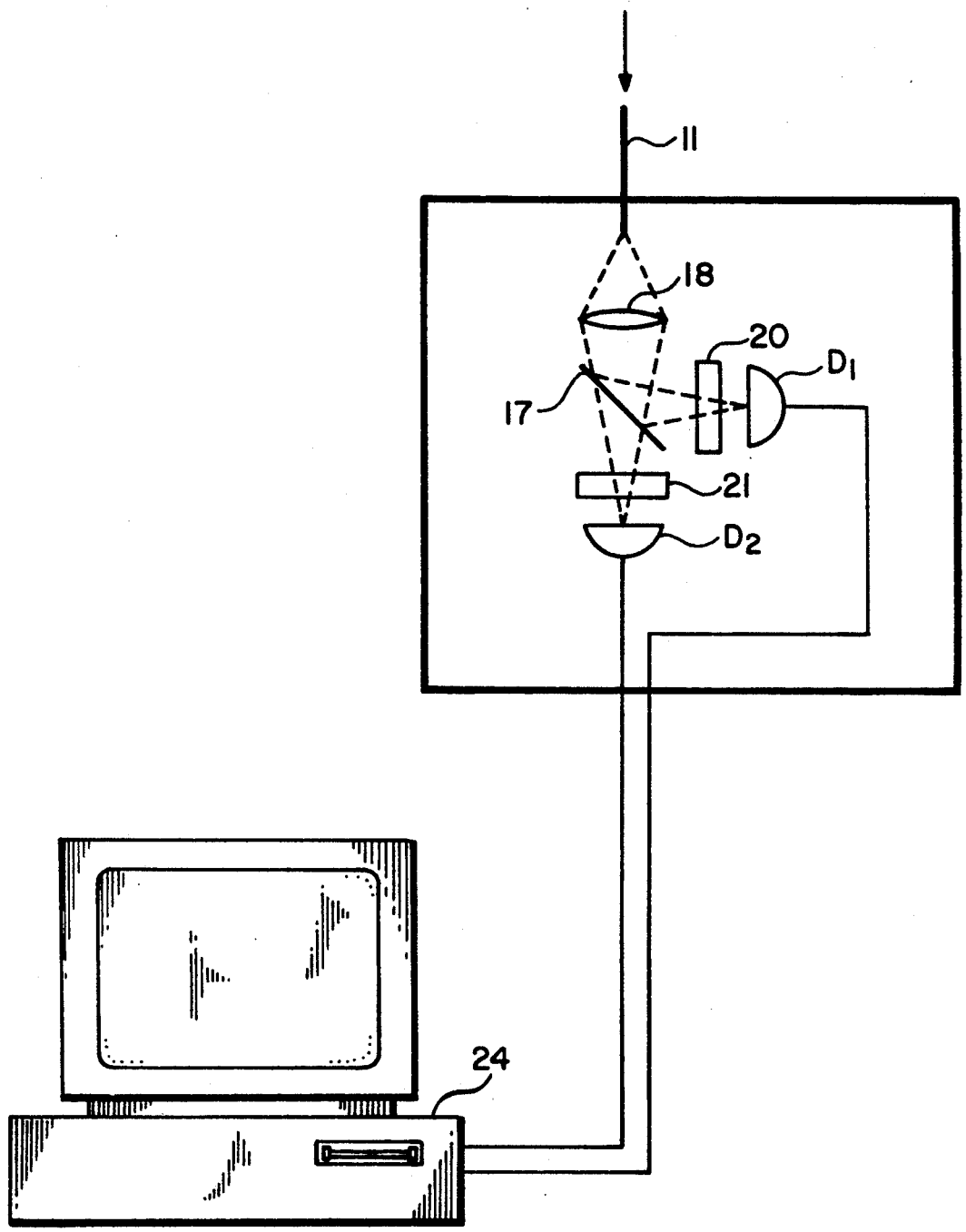

Turning now to FIG. 2, the radiation collected by the sensor head, i.e. at the output (second end) of the optical fibre 11, is sent to a system which is located away and protected from the harsh environment of the plasma spray gun. It should be well shielded electronically and kept in a quiet environment far from the operating spray gun and torch. Radiation from the optical fibre is imaged via a dichroic mirror 17, via a convex lens 18, on two photodetectors, $D_1$ and $D_2$, through respective interference filters 20 and 21. Output signals from detectors $D_1$ and $D_2$ are digitized in analog-to-digital converters (not shown) and may be analyzed by a computer 24 which computes the temperature and velocity of in-flight particles from the signals, as described below.

Figure 3:
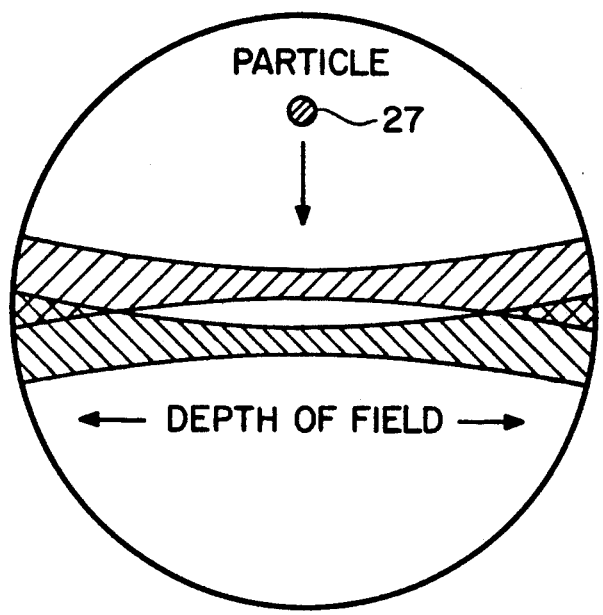

FIG. 3 illustrates the field of view of the two slits 15 of the sensor head. The depth of field is shown by the width between the horizontal arrow heads. A particle 27 of the mass of hot particles travelling through the focal plane will generate a double peak light (radiation) pulse as it moves from the field of view of the first slit to the field of the view of the second slit.

Figure 4:
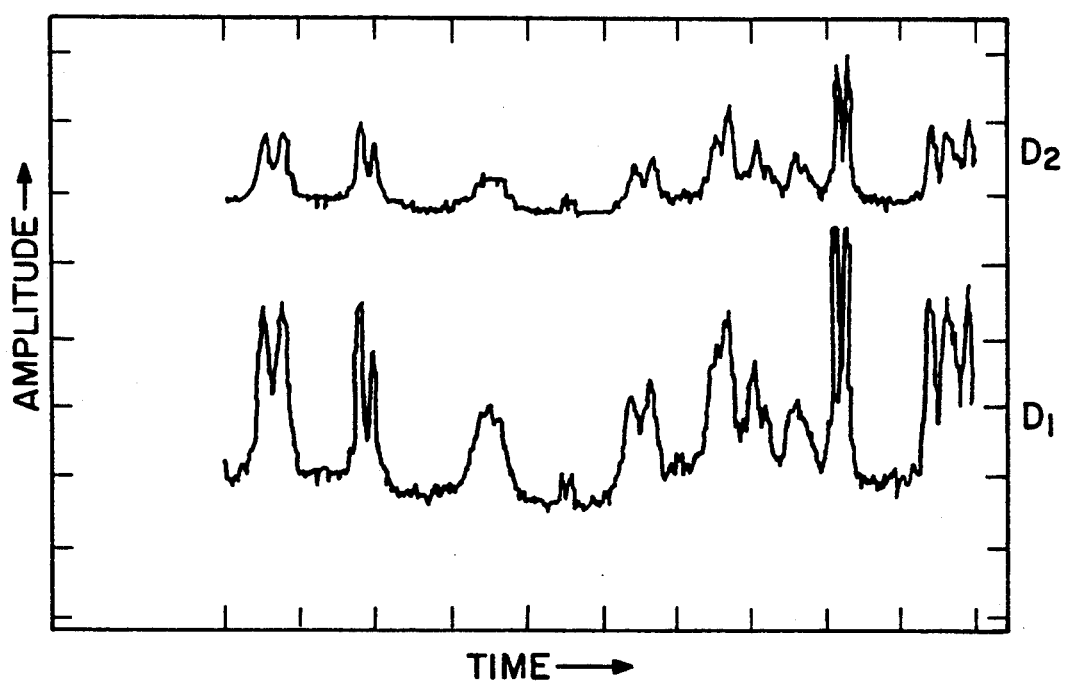

Examples of the light (radiation) pulses are illustrated in FIG. 4, which show signals output from both detectors $D_1$ and $D_2$ drawn as a function of time during the passage of a few particles in the sensor field of view. From the time delay between the two components of each pulse, the particle velocity can be computed, since the distance between the two slit images in the focal plane is known. The particle temperature may be determined from the ratio of the integrated light pulses at both wavelengths, i.e. from detectors $D_1$ and $D_2$. The slit dimensions should be established such that the radiation is collected from the smallest possible volume in the particle jet, to reduce to a minimum the background signal intensity, but the slit images must be larger than the particle diameter in order to collect intense light signals from each single particle.

The computer 24 analyzes the detector outputs by performing continuously statistical computation to obtain the mean and standard deviation of the temperature and velocity distributions. These values are used to provide continuous feedback to the plasma torch main spraying variables, i.e. arc current, powder feeding gas pressure, etc.

It may be seen that since the properties of the particles themselves immediately before their impact on the substrate are directly measured, the effect of plasma gun wear, etc., may be automatically compensated. Moreover, the direct particle localization may permit the measurement of temperature and velocity at many points within the particle jet, permitting obtaining a precise characterization of the spraying process. It may be seen that this has significant advantages over the indirect measurement techniques of monitoring arc current and power, arc gas flow rates, powder feed rates, and powder carrier gas pressure.

An advantage of the present invention over active projection particle velocity measurement techniques lies in the fact that the present invention does not require the use of fragile laser devices or intense light sources. Accordingly a more compact and rugged sensor is obtained that does not require any special eye protection for the operator.

The present invention may also be used in conjunction with the two-colour pyrometer described earlier, without the use of any additional detectors or electronics.

As compared to passive techniques, the use of the two-slit mask permits the particles to be measured directly without the use of a laser beam or a second detection assembly focused in the same region within the particle jet. The distance between the axes of the two focused beams is nearly constant through the depth of field, as shown in FIG. 3, while the width of a single beam, proportional to the time of flight in a single-slit configuration, changes very quickly. This requires a second coincidence detection to localize the particle, not required in the present invention. These advantages are particularly important in an industrial environment.

A person understanding this invention may now conceive of alternative structures and embodiments or variations of the above. All of those which fall within the scope of the claims appended hereto are considered to be part of the present invention.

We claim:

1. A method of detecting characteristics of plasma sprayed particles in a plasma jet during flight between a plasma jet gun and a substrate, comprising the steps of focusing radiation emitted from a particle on a first photodetector through a slit mask formed of at least two parallel slits, and transmitting signals from the photodetector to a processor for determining the velocity of the particle from time delay between two or more peaks which are detected resulting from said radiation.

2. A method as defined in claim 1, including the steps of splitting said radiation, filtering said radiation into separate adjacent wavelengths, passing one wavelength to the first photodetector, passing the other wavelength to a second photodetector, and transmitting signals from the second photodetector to said processor for integrating said signals from both photodetectors and determining the temperature of the particle from the ratio of the integrated signals.

3. A method as defined in claim 2, in which the focusing step includes carrying said radiation via an optical fibre from a position adjacent said plasma jet to a protected location remote from said plasma jet, and locating said photodetectors in said protected location.

4. A method as defined in claim 3 in which the focusing step includes passing radiation from said fibre through a convex lens, and via a dichroic mirror and through separate filters to said photodetectors.

5. A method as defined in claim 2, in which said dimensions of said slits are sufficiently small as to collect radiation from the smallest possible volume but sufficiently large so as to provide images each larger than the particle diameter.

6. A method as defined in claim 5, in which the slits are each about 25 $\mu$m wide, 50 $\mu$m long, and 50 $\mu$m centre to centre.

7. A method as defined in claim 6, in which the focusing step includes carrying said radiation via an optical fibre from a position adjacent said plasma jet to a protected location remote from said plasma jet, and locating said photodetectors in said protected location.

8. A method as defined in claim 7 in which the focusing step includes passing radiation from said fibre through a convex lens, and via a dichroic mirror and through separate filters to said photodetectors.

9. A method as defined in claim 3, including the step of collecting radiation from said plasma jet at one end of an optical fibre bundle, receiving said radiation in a CCD camera, and providing a signal from said camera for positioning said sensor head field of view relative to said plasma jet and/or detecting changes in particle injection characteristics.

10. An optical sensor for plasma sprayed particles in a plasma jet comprising:
    (a) a sensor head mounted rigidly adjacent the plasma jet, said head comprising:
       (i) an optical fibre for carrying radiation emitted by a particle in said jet to a protected location remote from said jet, and
       (ii) optical means for focusing said radiation on a first end of said fibre, and
       (iii) a slit mask formed of a pair of parallel slits disposed over said end of said fibre through which the radiation may pass,
    and at said protection location,
    (b) a pair of photodetectors,
    (c) means for splitting the radiation from a second end of said fibre,
    (d) means for filtering said split radiation into two separate adjacent wavelengths, and
    (e) means for passing the separate wavelengths into respective ones of said photodetectors.

11. An optical sensor as defined in claim 10, in which said splitting means is comprised of a dichroic mirror, further including a convex lens for focusing said radiation from the second end of said fibre via said mirror to said photodetectors, and in which said filtering means is comprised of a pair of optical filters each respectively placed between a corresponding photodetector and said mirror, for passing the split radiation in separate wavelengths to respective ones of said photodetectors.

12. An optical sensor as defined in claim 11, in which said optical means is comprised of a mirror for reflecting radiation from said particle, and a convex lens for receiving said reflecting radiation and focusing it on the end of said fibre.

13. An optical sensor as defined in claim 11, in which said parallel slits are about 25 μm wide, 50 μm long, and 50 μm centre to centre.

14. An optical sensor as defined in claim 10, further including an optical fibre bundle having one end disposed in said sensor head for detecting radiation emitted from said plasma jet, a CCD camera for detecting said radiation emitted from the other end of said bundle, and means for receiving a signal from said camera for positioning said sensor head field of view relative to said plasma jet and/or detecting changes in particle injection conditions.

* * * * *